US007240089B2

(12) United States Patent
Boudreau

(10) Patent No.: US 7,240,089 B2
(45) Date of Patent: Jul. 3, 2007

(54) MESSAGE QUEUING METHOD, SYSTEM, AND PROGRAM PRODUCT WITH REUSABLE POOLING COMPONENT

(75) Inventor: Michael K. Boudreau, Huntington Beach, CA (US)

(73) Assignee: International Business Machines Corporation, Armonk, NY (US)

( * ) Notice: Subject to any disclaimer, the term of this patent is extended or adjusted under 35 U.S.C. 154(b) by 540 days.

(21) Appl. No.: 10/013,757

(22) Filed: Dec. 10, 2001

(65) Prior Publication Data

US 2003/0135542 A1 Jul. 17, 2003

(51) Int. Cl.
*G06F 15/16* (2006.01)

(52) U.S. Cl. ...................................... 709/203; 709/206

(58) Field of Classification Search ................ 709/203, 709/206

See application file for complete search history.

(56) References Cited

U.S. PATENT DOCUMENTS

| | | | | |
|---|---|---|---|---|
| 5,093,912 | A | 3/1992 | Dong et al. | 395/650 |
| 5,694,546 | A * | 12/1997 | Reisman | 705/26 |
| 5,781,536 | A | 7/1998 | Ahmadi et al. | 370/252 |
| 5,870,385 | A | 2/1999 | Ahmadi et al. | 370/252 |
| 5,905,889 | A | 5/1999 | Wilhelm, Jr. | 395/674 |
| 6,134,617 | A * | 10/2000 | Weber | 710/105 |
| 6,138,237 | A * | 10/2000 | Ruben et al. | 713/200 |
| 6,385,644 | B1 * | 5/2002 | Devine et al. | 709/206 |
| 6,385,658 | B2 * | 5/2002 | Harter et al. | 709/312 |
| 6,442,592 | B1 * | 8/2002 | Alumbaugh et al. | 709/206 |
| 6,549,934 | B1 * | 4/2003 | Peterson et al. | 709/203 |
| 6,732,101 | B1 * | 5/2004 | Cook | 707/10 |

OTHER PUBLICATIONS

Calcote, J. "*Thread Pools and Server Performance*", Dr. Dobb's Journal, vol. 22, No. 7, Jul. 1997, p. 60, 62-4, 86-9.

Favalli, L. et al., "*Sectorized Channel Borrowing Scheme with Resource Pooling*" IEEE VTS 50th Vehicular Technology Conference, vol. 5, pp. 3019-3023, Amsterdam, Netherlands, Sep. 1999.

Conte, M. T. et al., "*A Study of Code Reuse and Sharing Characteristics of Java Applications*", Workload Characterization: Methodology and Case Studies. Based on the First Workshop on Workload Characterization, pp. 27-35, Dallas, TX, Nov. 1998, Published Los Alamitos, CA, USA, 1999, vii+153 pp.

Hutchison, G. and Mulholland, M., "*Optimum Thread Seclection in an OO Application Server*", IBM Research Disclosure v41, n416 Dec. 1998 Article 416151.

* cited by examiner

*Primary Examiner*—David Wiley
*Assistant Examiner*—Kyung-Hye Shin
(74) *Attorney, Agent, or Firm*—Sawyer Law Group LLP

(57) ABSTRACT

A pooling mechanism to limit repeated connections in message queuing systems and to prevent excessive making and breaking of connections and associated overhead. The invention does this by providing a layer between a client and the message queuing system where connections are pooled. The pooling mechanism of the invention prevents a system from losing too many resources through the repeated making and breaking of excessive message queuing system connections.

5 Claims, 11 Drawing Sheets

MESSAGE QUEUING METHOD, SYSTEM, AND PROGRAM PRODUCT WITH REUSABLE POOLING COMPONENT

FIELD OF THE INVENTION

The invention relates to methods, systems, and program products for queuing data and transferring the queued data among a plurality of computers via one or more communications media (e.g., computer networks) where the computers employ the data in data processing before or after the transfer, and where the data processing systems perform different tasks on the shared data and also affect the data transfer between the computers (as reply and response). The invention further relates to methods, systems, and program products including a data processing entity, executing within one or more computers, for establishing a dialog with another computer or application program in order to facilitate queuing and transferring data between the computers or application programs. This is accomplished in a system having at least one local computer that provides a user interface and performs local data processing, and that interacts with at least one remote computer which implements data processing (e.g., data management, data sharing) in response to the local computer, so as to queue data and to transfer the queued data between the local computer and the remote computer.

BACKGROUND OF THE INVENTION

Multi-platform and multi-application tasks require heavy message exchanges between the platforms or applications. One aspect of the heavy message traffic is message queuing. MQSeries is a method of message queuing that enables disparate applications to communicate with one another across a network of disparate components, such as processors, systems, subsystems, and communications protocols. It provides a consistent application program interface (API) or set of application program interfaces across all of the platforms.

Queuing means that the program-to-program communication is indirect communication, where the end user or programmer specifies a target queue name rather then a target application name. In IBM MQSeries message queuing the application programs communicate by sending messages through respective Message Queue Interfaces, and MQSeries MQ objects, over a network.

A further aspect of queuing is that the end user or programmer does not have to worry about the target application being busy, down, or otherwise unavailable. This is because the program sends messages to a queue that is associated with the application rather then to the application itself, and the MQSeries API takes care of transport to the target application, even including starting the target application if necessary.

MQSeries Message Queuing includes a Message Queue Manager (MQM). The MQM provides a Message Queuing Interface (MQI) by issuing API calls. For example, the API MQPUT puts a message on a queue to be read by another program using the API MQGET. In MQSeries message queuing an application program issues a PUT to place the message in a first or outgoing queue, addressed to application program, via a channel (if the applications are on different platforms). The Application program issues an MQGET to receive the message in its queue.

The message queuing manager manages the message queues for application programs and provides an application program interface, the message queue interface. The queue manager preferably uses existing networking facilities to transfer messages between applications (and platforms). In interfacing with DBMS's and databases, the message queue interface coordinates updates to databases, using a two phase commit process. In this regard, "gets" and "puts" to and from queues are committed together with SQL updates, or backed out, if necessary.

Messages can be segmented or grouped, that is, the Message Queuing Interface segments messages and reassembles them, and also groups small messages together. This segmenting and grouping capability minimizes network overhead. Segmenting is used when the message does not fit into a queue, for reassembly at the receiver MQI (message queuing interface). By way of contrast, in grouping, several small messages from one process to another single process can be grouped together for transmission. This serves to reduce network overhead.

Message queuing messages can be characterized as persistent and non-persistent. A persistent message must be delivered under any circumstances, while a non-persistent message need not be delivered if not delivered by its expiration date.

The queue manager uses queue objects, process definition objects, and channel objects, as well as platform specific objects, such as buffer pool objects, and user space objects to accomplish message queuing. In this context, a channel object, that is, a connection, is a logical communications link. The queue manager supports message channel objects and message queuing interface channel objects. A message channel object connects two queue managers via message channel agents. Typically, a message channel is unidirectional, and has two channel agents, a sender and a receiver, and a communications protocol. The message channel agent (MCA) is a program that transfers messages from a transmission queue to a communications link, and from the communications link into a target queue. For bidirectional communications, it is necessary to define channel pairs consisting of a sender and a receiver.

The other type of channel object, a Message Queue Interface (MQI) channel object, connects an MQSeries client to a queue manager in its server machine. An MQI channel is bidirectional.

A queue manager is started by commands to run the message queue manager (runmqsc), define the local queue ("define qlocal('QUEUENAME')"), define objects and attributes of the local queues created by the "runmqsc" command ("mydefs"), modify or change the local queue ("alter qmgr"), and close the queue ("end").

Generally, in a client-server architecture, the queue manager resides on the server, and is shared by all of the clients. Thus, all of the MQSeries objects, such as queues, are in the server. However, an MQ server can be both a client and a server, with intra-platform, inter-process queues. To be noted is that MQSeries distinguishes between clients and servers. For example, MQSeries, when installed on a distributed platform, can be a client, a server, or both. Moreover, local clients may have a local queue manager. Slim clients do not have a local queue manager, while fat clients do have local queue manager. In the case of mobile clients where the connection between client and server may not always exist, it is advantageous for the local client to be a fat client with a local queue manager.

In a typical MQSeries client-server connection, all of the clients use queue managers on the server machine. When the client puts a message on the queue, the message ultimately has to be read and processed by a program on the server. The reading program can be started when the server starts, or the queue manager can start it by using an MQSeries triggering mechanism.

In MQSeries, by way of exemplification, the client sends a request by issuing five API calls:

1. A message queue connect API call, as MQCONN, to connect to the queue manager in the server.
2. A message queue open API call, as MQOPEN, to open the message queue QS1 for output.
3. A message queue put API call, as MQPUT, to put a message in the queue (there may be many messages in the queue).
4. A message queue close API call, as MQCLOSE, to close the queue QS1.
5. A message queue disconnect API call, as MQDISC, to disconnect from the queue manager.

The MQSeries client that runs in the client machine processes API calls and routes them to the machine defined in the environment variable.

The server uses at least five queue manager objects to receive a request. These include a server connection channel, a local queue into which the clients place their messages, an initiation queue into which the queue manager puts a trigger message when a request for the queue arrives, a process definition object that contains the name of the program to be started when the trigger event occurs, and one or more queues into which the server program, puts the reply message.

In the server machine two programs have to be started to enable message queuing, the listener, and the trigger monitor. The listener listens for messages and puts them on the queue. Since the queue is triggered, the message queue manager puts a trigger message on the trigger queue each time a message is put on the queue. When a process is placed on the trigger queue, the trigger monitor starts the program to define in the process.

The server program connects to the queue manager, opens the queue and issues a message queue get, MQGET, to read the message. After processing a request, the server puts a reply on the specific reply queue for the client. The server does this by opening up the output queue and issuing a message queue put, MQPUT API. The client knows the name of its input queue, and issues a message queue get, MQGET API to receive the reply.

An application program, whether on the client or on the server, talks directly to its local queue manager. The queue manager typically resides in the same processor or domain as the program itself. The program uses the Message Queuing Interface (MQI), where the Message Queuing Interface (MQI) is a set of API calls that request services from the queue manager.

The API's provide for connection to a queue manager, disconnection from a queue manager, opening a specific queue, closing a specific queue, putting a message on a queue, getting a message from a queue, inquiring of the properties of an object, setting the properties of an object, binding, beginning a unit of work, committing a unit of work, and backing out. Also, API's can be combined, as into one API to open a queue, put on a message on the opened queue, and close the queue. However, even with this expedient of connections, as queues and channels, when a connection between a client and its server is broken, no API calls can be executed by the client without reestablishing the connection, since all objects reside on the server.

As with any other type of connection (i.e. database or socket), there is overhead associated with setup and initialization of message queuing connections. This overhead includes the time expended in establishing and re-establishing connections. What is needed is a mechanism that avoids the overhead associated with making and breaking of connections while keeping connections alive and reusable by many clients.

SUMMARY OF THE INVENTION

According to the invention losses and overhead costs associated with message queuing may be obviated by a message pooling layer between a client layer and a message queuing layer to provide a pool of reusable message queuing connections between them. The message pooling layer has a connection pool as a container for containing reusable message queuing connections, a pool preserver running separate threads to maintain the connection pool, and a message queue manager to receive requests for message queuing connections.

The message pooling layer associated with a message queuing system may be implemented in a program product having computer readable code on a media to configure and control a computer and thereby establish a message pooling layer between a client layer and a message queuing layer. The pooling layer provides a pool of reusable message queuing connections between the client and the message queuing layer.

A further aspect of the invention is a method of queuing messages between a plurality of application programs running on one or more computers connected by a communications channel with at least one message queue. The method includes the steps of creating reusable message queuing connections, storing the message queuing connections in a connection pool; and running threads to maintain message queuing connections.

The method, system, and program product described herein provide a pooling mechanism as a way to “limit” repeated connections in message queuing systems and to prevent excessive making and breaking of connections and associated overhead. The method, system, and program product of the invention do this by providing a layer between a client and MQ Series. Normally, when the connections in the pool run out, the next client will have to wait for one of the used connections to become freed up. The pooling mechanism of the invention prevents a system from losing too many resources through the creation of excessive message queuing system connections.

THE FIGURES

Various aspects of the invention and of the relevant background information are illustrated in the FIGURES appended hereto.

Figure 5:
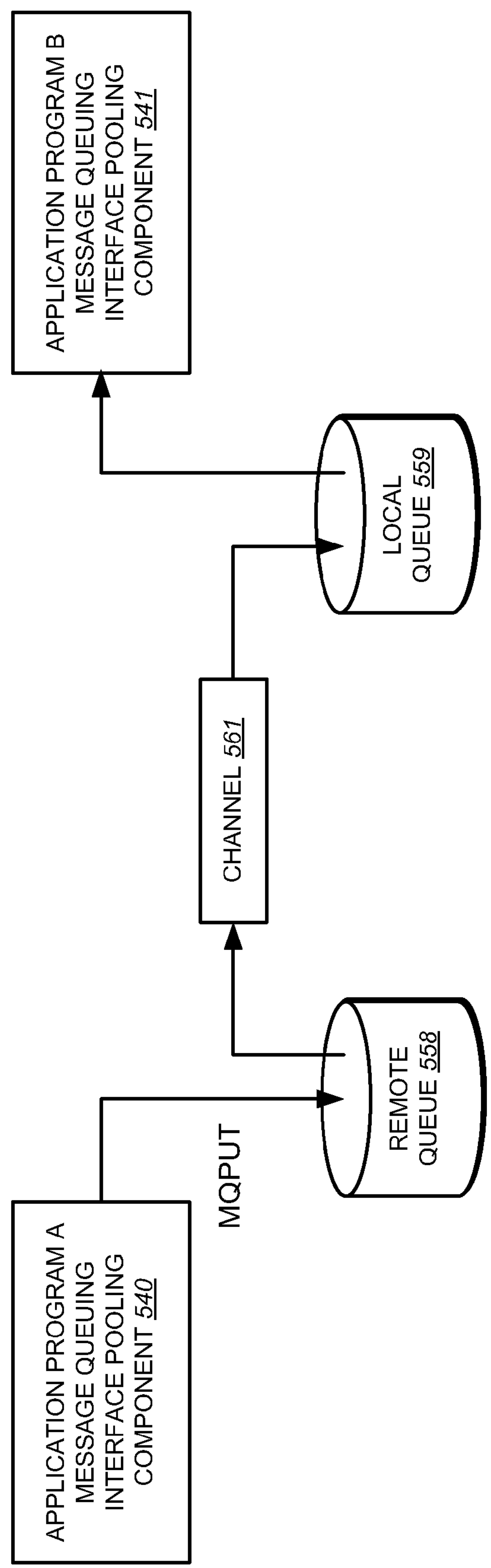

FIG. 5 illustrates the use of API MQPUT and MPI MQGET inter messaging between two applications on different platforms, via a channel where an application program issues a PUT to Q1 to place the message in a Queue, addressed to application program, running on a different platform from the sending application program . This message is passed through the pooling component layer and to and through the channel to a queue where application program issues an MQGET for Q1 to receive the message in the incoming queue.

Figure 6:
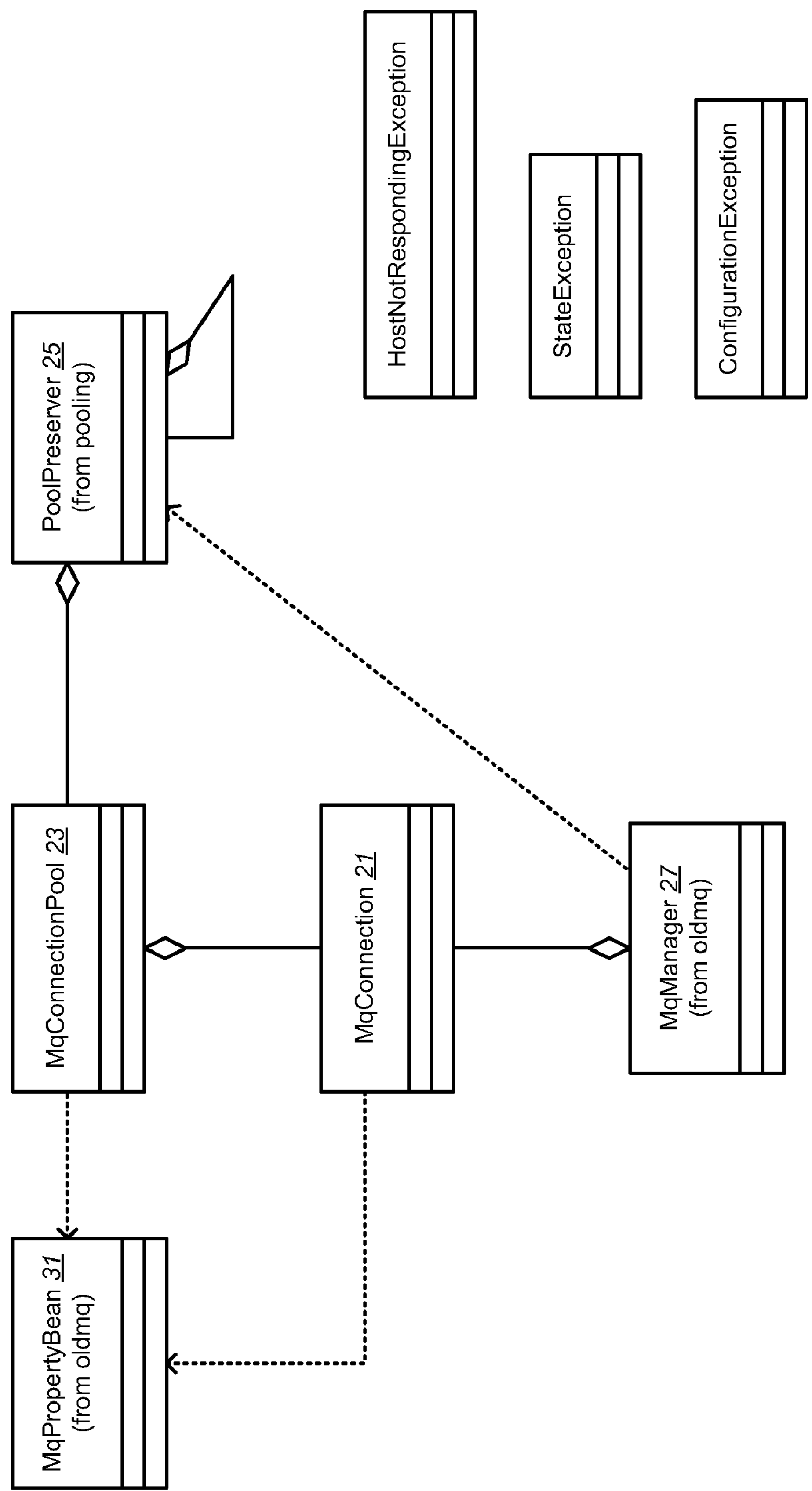

FIG. 6 is a class diagram illustrating MQConnection working through MqManager and MqConnectionPool and the MqPropertyBean and PoolPreserver maintain and preserve the connection pool.

Figure 7:
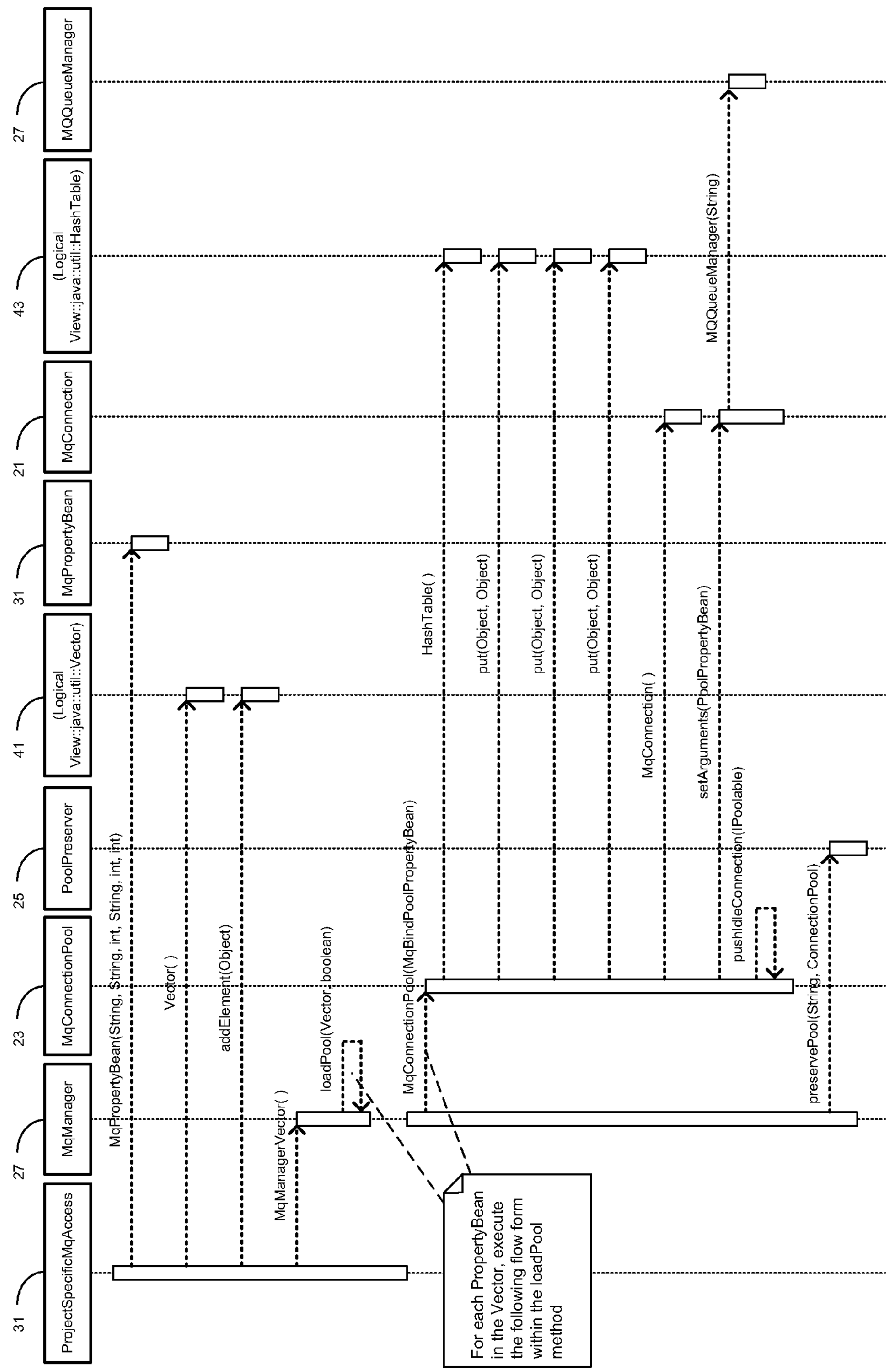

FIG. 7 illustrates a time line of pool component initialization for MQueueManager (string).

Figure 8:
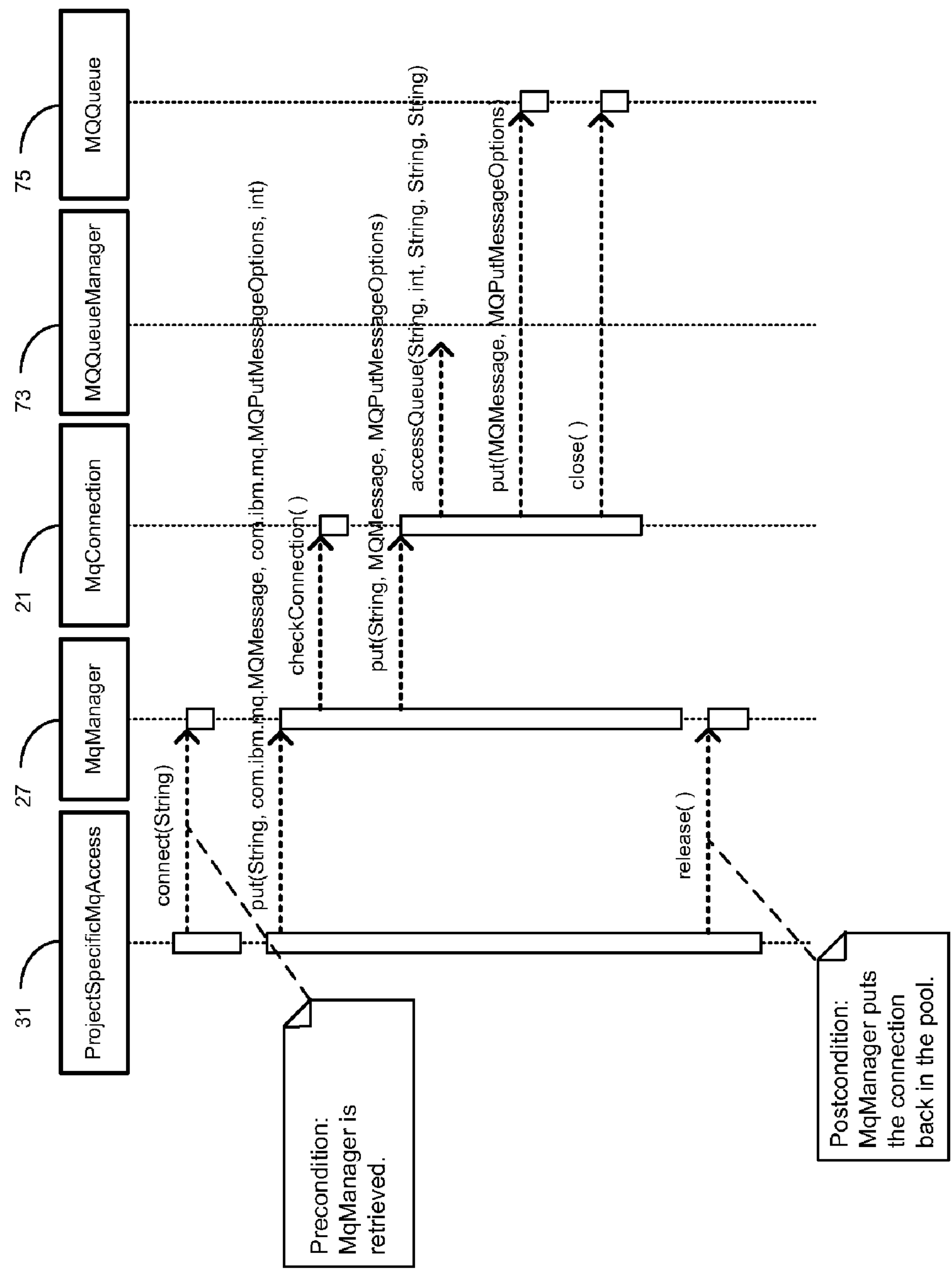

FIG. 8 illustrates the actions of ProjectSpecificMqAccess MqManager MqConnection MqQueueManager and MqQueue in putting a message on the message queue.

Figure 9:
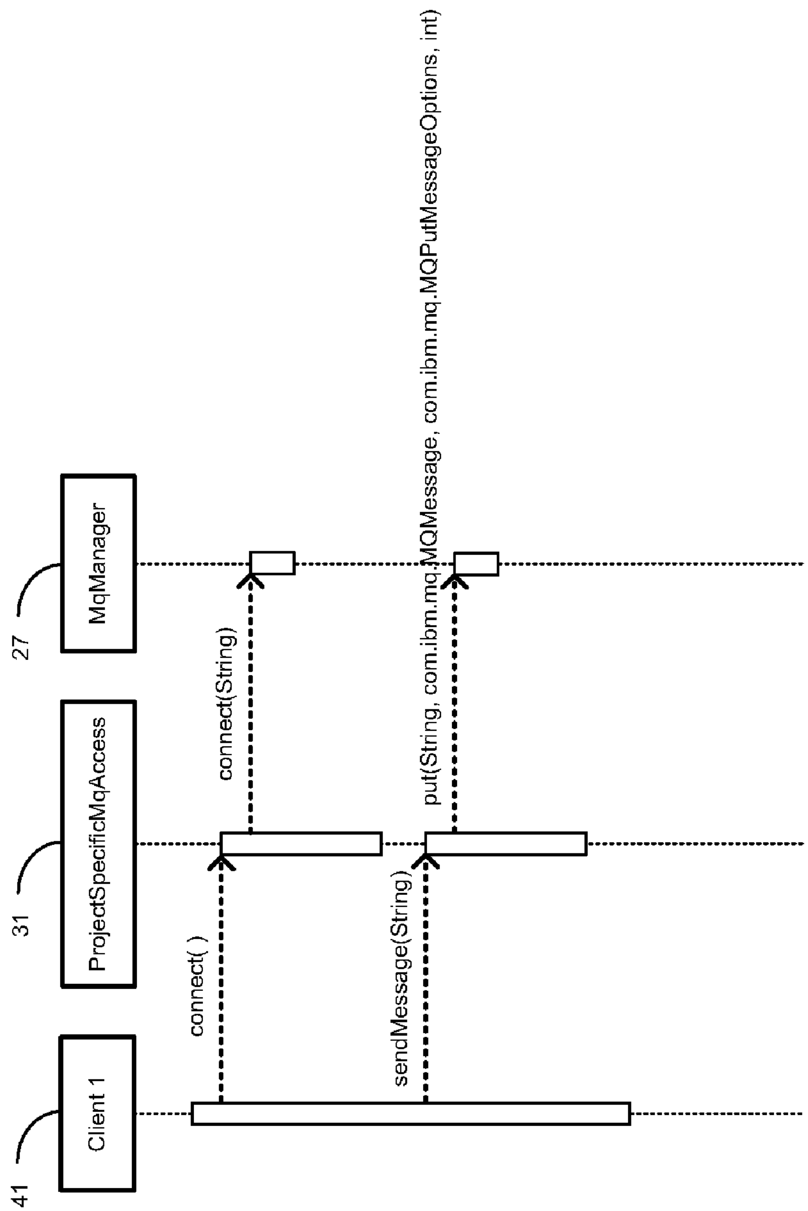

FIG. 9 illustrates a client, here a Client, ProjectSpecificMqAccess and MQManager in a client view of an MQ message.

Figure 10:
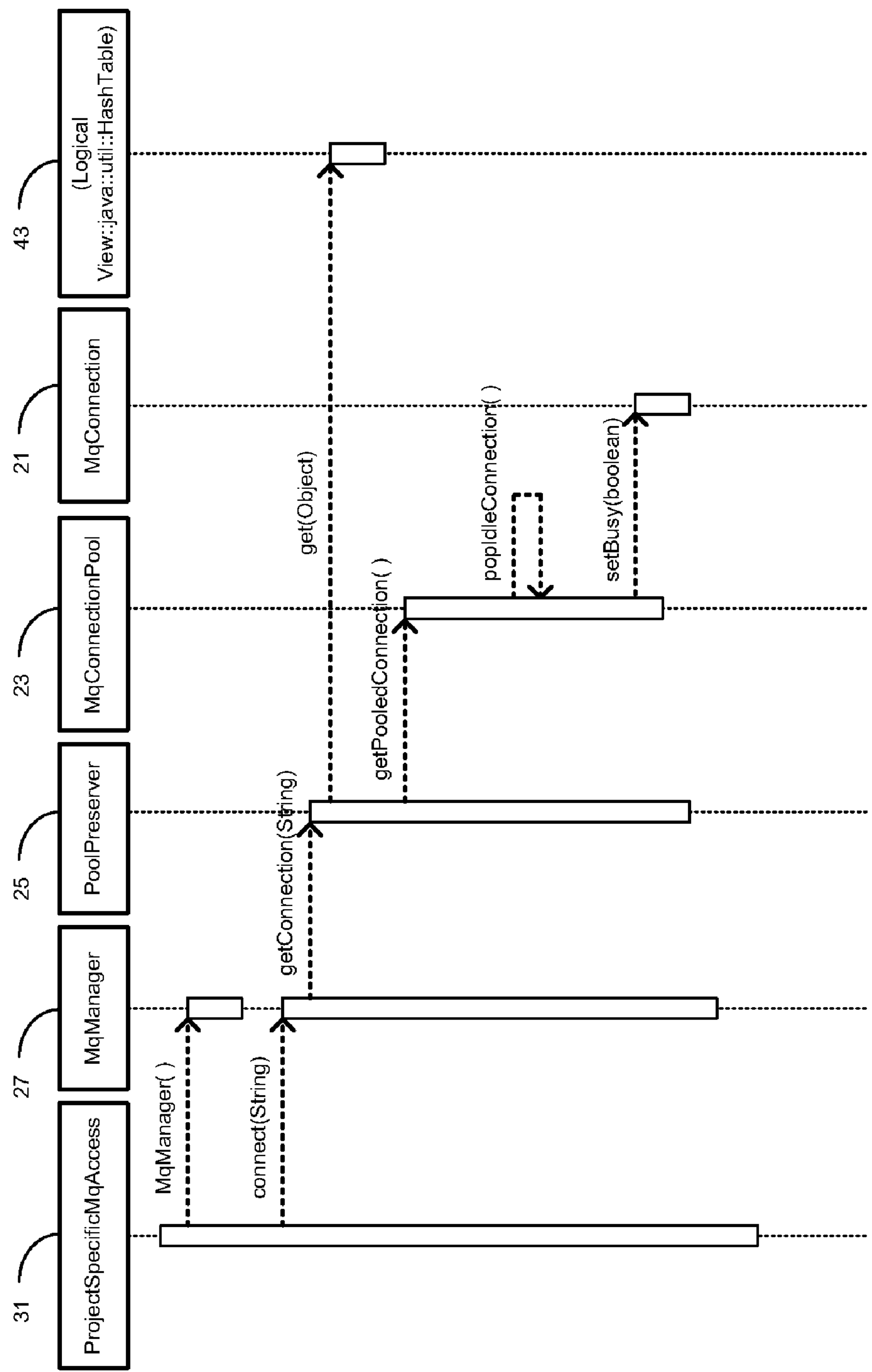

FIG. 10 illustrates the use of ProjectSpecificMqAccess MqManager PoolPreserver MqConnectionPool and MqConnection to retrieve a connection from the connection pool.

Figure 11:
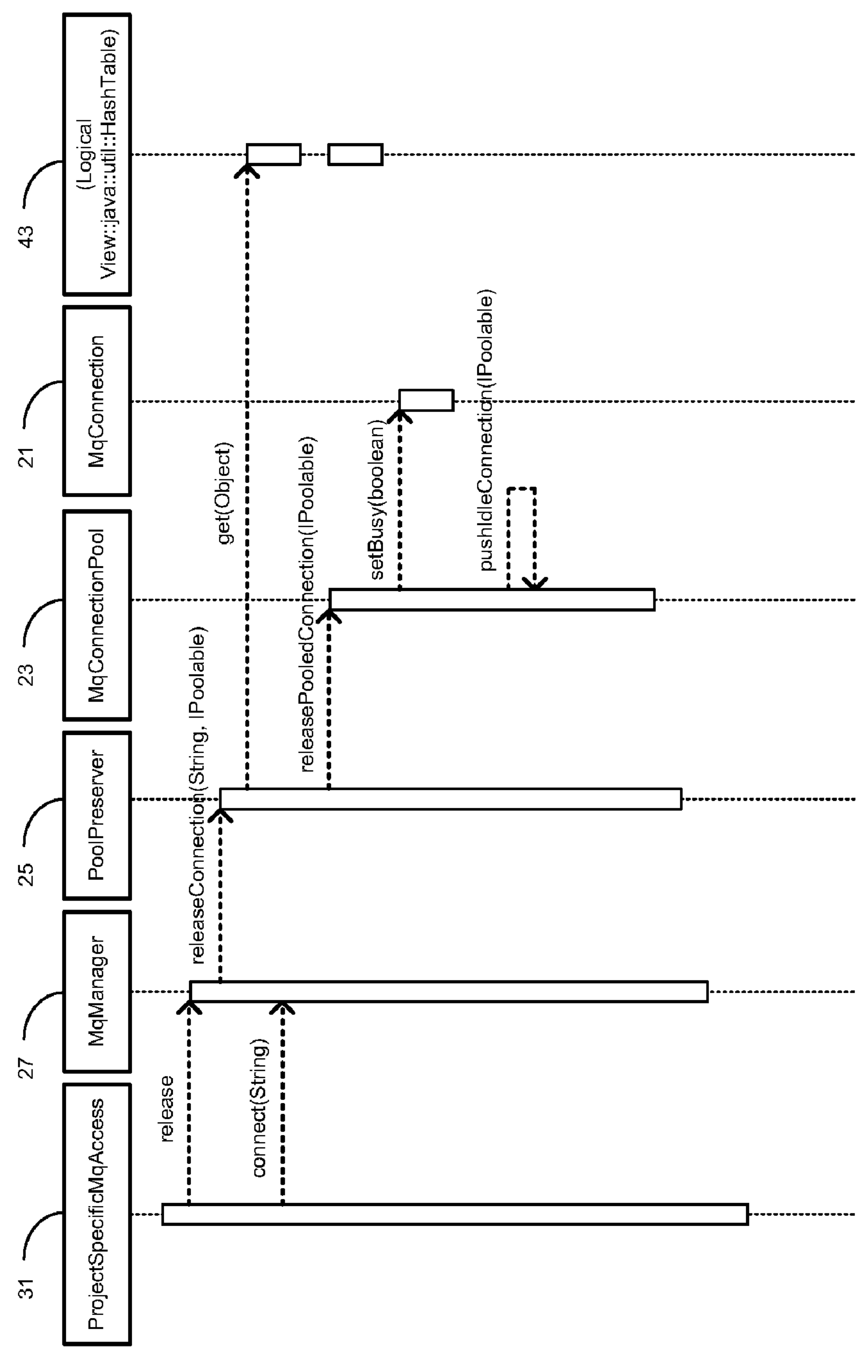

FIG. 11 illustrates the use of ProjectSpecificMqAccess MqManager PoolPreserver MqConnectionPool and MqConnection to release a connection back to the connection pool.

DETAILED DESCRIPTION

In the following description of the preferred embodiments reference is made to the accompanying drawings which form a part thereof, and in which are shown by way of illustration specific embodiments in which the invention may be practiced. It is to be understood that other embodiments may be utilized, and structural and functional changes may be made without departing from the scope of the present invention.

Described herein is a pooling mechanism that "pools" message queuing connections, as MQ Series connections. Connection pooling keeps message queuing connections alive and reusable by many clients. As with any other type of connection (i.e. database or socket), there is overhead associated with setup and initialization. The time expended in establishing and re-establishing connections detracts from availability and performance. As described herein, to increase performance, this setup and initialization is done only once and the connection is preserved.

Figure 1:
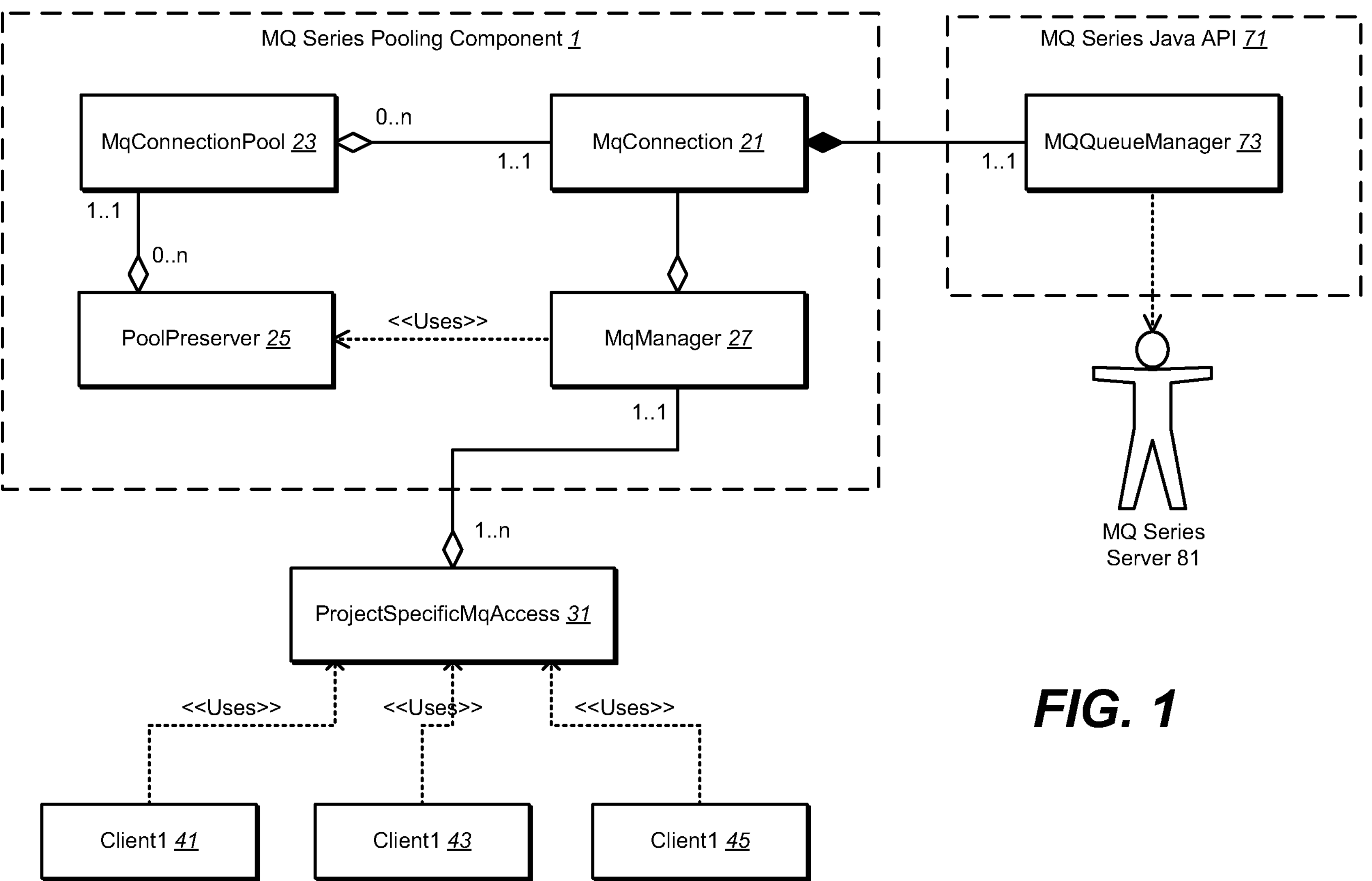
FIG. 1 is a logic diagram of the connection pooling component layer interposed between a client and the message queuing layer.
Figure 2:
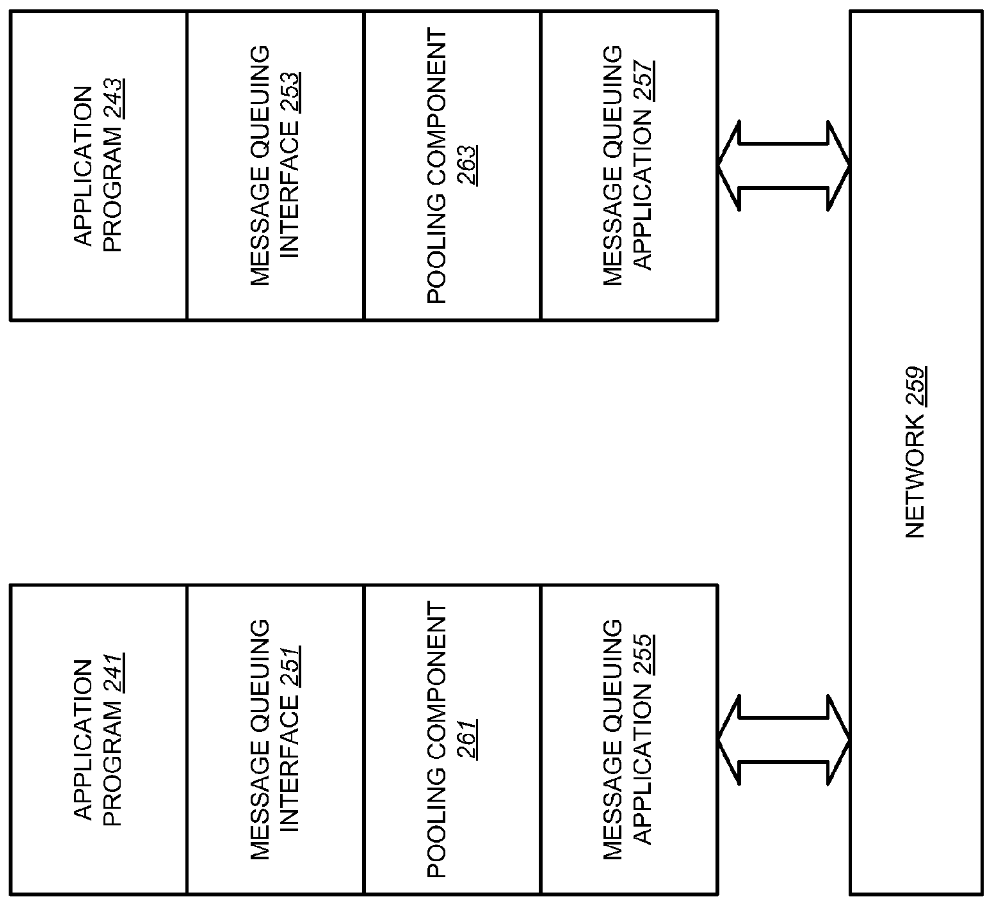
FIG. 2 is a logic diagram of message queuing system including the connection pooling component layer interposed between a client, the message queuing layer, the communication channel, and the server.

The method, system, and program product of the invention does this by providing a pooling component layer, illustrated in FIGS. 1 and 2, between a client (which may be an application client or n application server) and the message queuing layer, for example, an MQ Series message queuing layer. The pooling mechanism provided by the pooling component layer prevents a system from expending too much effort and resources in creating message queuing connections, in creating them too frequently, and in repetitively creating them.

The pooling component establishes connections (contained in MQConnection), and then puts them into a connection pool (MQConnectionPool). The connection pool is preserved by being placed in a separate running thread called a pool preserver. When clients (Client 1–3) request a message queuing connection (from ProjectSpecificMQAccess), the connection is withdrawn from the connection pool and assigned to the client.

According to the invention, the pool preserver and connection pool interact to keep the connection open. The pool preserver allows the component to contain multiple pools for different queue managers. The connection pool contains one message queuing system connection for each actual established connection.

The interaction between the PoolPreserver running thread and the MQConnectionPool, as a sub-system, within the MQSeries message queuing system as a larger system operating between two or more applications and/or platforms is illustrated in FIGS. 1, 2, 3, 4, and 5.

FIG. 1 illustrates one embodiment of the pooling component, 1, interposed between the message queue, 71, and server, 81, and the clients, 41, 43, 45. The pooling component, 1, includes an MQConnection, 21, in communication with the message queue, 71, and server, 81. The connections are maintained in the MqConnectionPool, 23, through the running thread of the PoolPreserver, 25. The PoolPreserver running thread is controlled by the MqManager, 27. The MqManager, 27, is in communication with the clients, 41, 43, and 45, through a Project Specific MqAccess module, 31.

As shown in FIG. 2, application programs, 241 and 243, communicate by sending messages through respective message queue interfaces, 251 and 253, and message queuing objects, 255 and 257, (including pooling components 261 and 263 which, for purposes of illustration are shown between the message queue interface and the message queue objects) over a network, 259. In this way application programs communicate by sending data in messages, with message queuing. Queuing means that the program to program communication is indirect communication. That is, the end user or programmer specifies a target queue name rather then a target application name. In this way the end user or programmer does not have to worry about the target application being busy, down, or otherwise unavailable. This is because the programmer send messages to a queue that is associated with the application, and the message queuing API takes care of transport to the target application, even including starting the target application if necessary.

Figure 3:
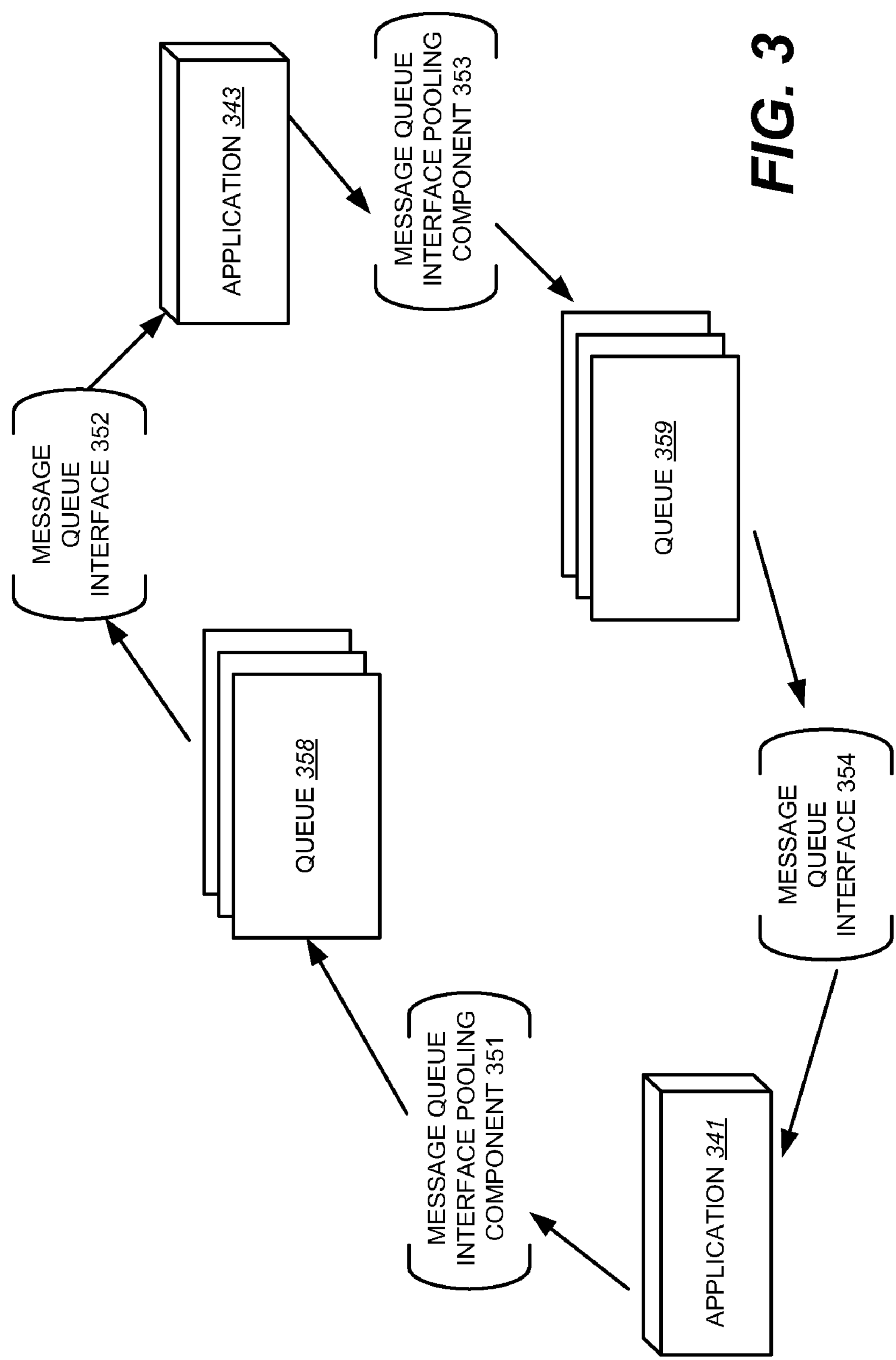
FIG. 3 is a representation of a network with message queuing.

FIG. 3 generally shows two applications, 341 and 343 communicating through message queue interfaces (including pooling components) 351, and 353, to and through queues, 358 and 359, to message queue interfaces, 352 and 354 and on to the opposite application program.

Figure 4:
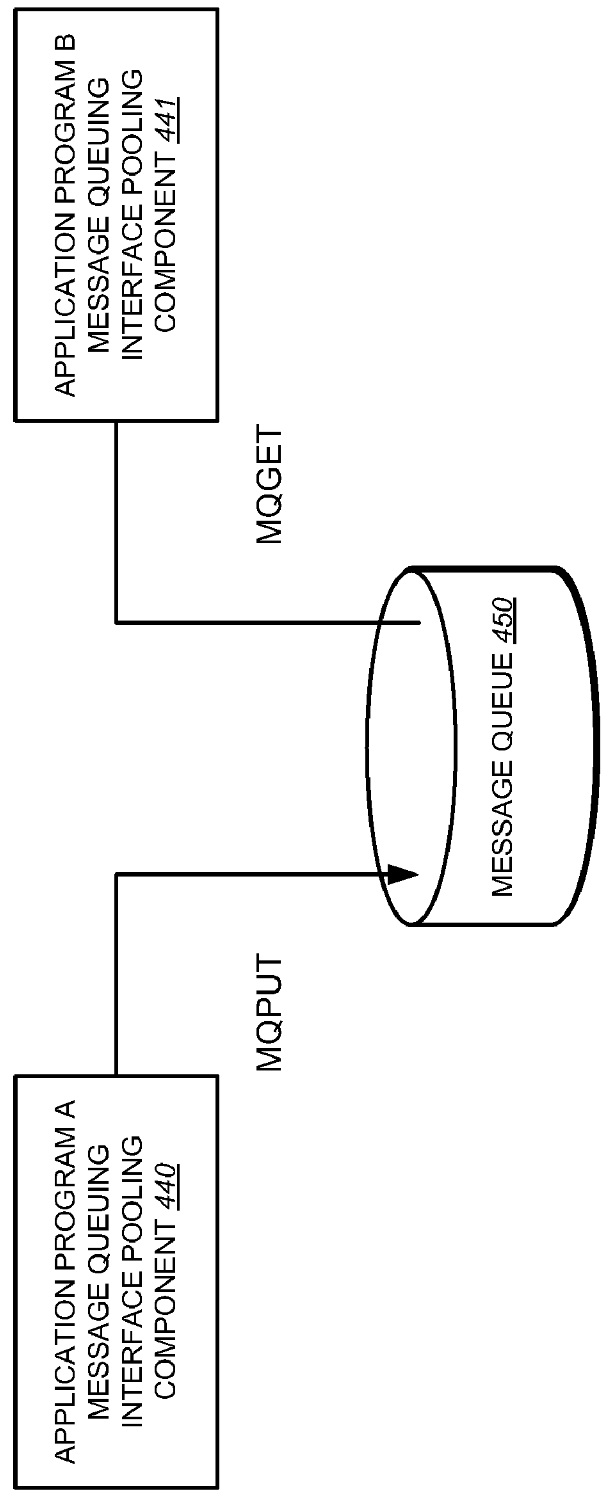
FIG. 4 illustrates an application program issuing a PUT to Q1 to place the message in the outgoing queue addressed to an application program running on the same platform as the sending application program The application program issues an MQGET for Q1 to receive the message in the queue.

FIG. 4, and FIG. 5 illustrate the operation of the Message Queue Manager (MQM) with the method, system, and program of the invention. The MQM provides a Message Queuing Interface (MQI) by issuing API calls. For example the API MQPUT puts a message on a queue to be read by another program using the API MQGET. This is illustrated in FIG. 4 for interprocess queuing on a single platform and FIG. 5. In FIG. 4 application program 440 issues an MQPUT to Q1 to place the message in Queue 450, addressed to application program 441, running on the same platform as the sending application program 440. Application program 441 issues an MQGET for Q1 to receive the message in Queue 450.

FIG. 5 illustrates the use of API MQPUT and API MQGET in messaging between two applications, 540, and, 541, on different platforms, via a channel, 561. In FIG. 5 application program 540 issues a PUT to Q1 to use a pooled connection to place a message in Queue 558, addressed to application program 541, running on a different platform from the sending application program 540. This message is passed through the channel, 561, to a pooled connection in queue 559, where application program 541 issues an MQGET for Queue 559 to receive the message.

Appendix A and FIGS. 6 through 11 illustrate a preferred embodiment of the method, system, and program product of the invention. Specifically, Appendix A contains samples of the Java code for the message queuing pooling method, system, and program product of the invention, while FIGS. 6 through 11 illustrate the sequence in which these objects are called in pooling connections.

Appendix A-1 illustrates the code for MQConn which represents a single connection (and thread) to the MQQueueManager. This is the object that is pooled, and handed out to the MQManger to use.

Appendix A-2 illustrates the code for MQConnPool. MQConnPool manages a pool of MQConn objects (above). "One" MQConnPool "has-a" "many" MQConn objects, that is, a "One to Many" relationship. Managing MQConn objects involve creation, cleanup, and maintenance of the pool.

Appendix A-3 illustrates the code for MQConnPoolManager. MQConnPoolManager is a separate thread that sits in a "wait" state. Its function is to ensure that an object is never garbage collected. This keeps the class and everything it references from being garbage collected.

Appendix A-4 illustrates the code for MQManager. MQManager is a simple interface to the connection pool that provides basic connect, get, put, and release methods to access and use the MQ Pool. Typical uses would be to create a project-specific interface that uses this class in a "has-a" type relationship. Another use would be to create the project-specific interface that extends this class in a "is-a" type relationship. Extending the class should be done when specific customizations need to be done to the original interface methods.

Appendix A-5 illustrates MQPoolPropertyBean. This is a container that contains information needed for creating the MQConnPool.

Appendix A-6 illustrates MQPoolTest. MQPoolTest implements Runnable. FIG. 1 illustrates how any one or more of the clients, 41, 43, 45, going through ProjectSpecificMqAccess module 31 to the MQ Series Pooling Component, 1. Within the Pooling Component, 1, MqManager, 27, uses PoolPreserver, 25, to call the connections in MqConnectionPool, 23, to establish MqConnection, 21, with the MQ Series Server, 81, through the MQQueueManager, 73, in the MQ Series Java API, 71.

FIG. 6 is a class diagram illustrating MQConnection, 21, working through MqManager, 27, and MqConnectionPool, 23, and the MqPropertyBean, 31, and PoolPreserver, 25, maintain and preserve the connection pool.

FIG. 7 illustrates a time line of pool component initialization for MQueueManager (string). ProjectSpecificMQAccess, 31, initializes MqPropertyBean, 31, Vector, addElement, and MQManager, 27. MQManager, 27, starts loadVector, and MQConnectionPool, 23, after which MQManager, 27, with MQConnectionPool, 23, starts hashTable, multiple puts (three are shown), MqConnection, 21, setArguments (which, with MqConnection, 21, starts MQQueueManager, 22), and preservePool, 25.

FIG. 8 illustrates the actions of ProjectSpecificMqAccess, 31, MqManager, 27, MqConnection, 21, MqQueueManager, 73, and MqQueue, 75, in putting a message on the message queue. While MqManager, 27, is running, ProjectSpecificMqAccess, 31, creates a connect(string), and puts the string onto MqManager, 27, and, after the connection is back in the pool, releases the message. MqManager, 27, checks the connection, puts the string onto MqConnection, 21. This causes MqConnection to access MqQueue, 75, through MqConnectionManager, 73, put the message on MqQueue, 75, and close MqQueue, 75.

FIG. 9 illustrates a client, here Client 41, ProjectSpecificMqAccess, 31, and MQManager, 27, in a client view of an MQ message. In this view, the client connects and sends a message through ProjectSpecificMqAccess, 31. ProjectSpecificMqAccess connects to MqManager, 27, and puts an Mq message to MqManager, 27.

FIG. 10 illustrates the use of ProjectSpecificMqAccess, 31, MqManager, 27, PoolPreserver, 25, MqConnectionPool, 23, and MqConnection, 21, to retrieve a connection from the connection pool. Specifically, ProjectSpecificMqAccess, 31, starts MqManager, 27, and sends a connection(string) to MqManager, 27, to send a getConnection message to PoolPreserver, 25. This causes PoolPreserver, 25, to issue a get(Object) and to send a getPooledConnection() to MqConnectionPool, 23. MqConnectionPool issues a popIdleConnection() and sends a setBusy(Boolean) to MqConnection, 21.

FIG. 11 illustrates the use of ProjectSpecificMqAccess, 31, MqManager, 27, PoolPreserver, 25, MqConnectionPool, 23, and MqConnection, 21, to release a connection back to the connection pool. ProjectSpecificMqAccess, 31, issues a release, causing MqManager, 27, to issue a releaseConnection to PoolPreserver, 25. PoolPreserver, 25, issues a get (object), and also issues a releasePooledConnection MqConnectionPool, 23. This causes MqConnectionPool, 23, to issue a setBusy and to issue a pushIdleConnection.

The queue manager manages the message queues for application programs, as illustrated above. It also provides an application programming interface, the Message Queue Interface. The Queue Manager preferably uses existing networking facilities to transfer messages between application (and platforms, as described and illustrated above). In interfacing with DBMS's and databases, the Message Queue Interface coordinates updates to databases, using a two phase commit process. In this regard, gets and puts to and from queues are committed together with SQL updates, or backed out, if necessary.

In setting up the channel, the transmission protocol, the port the listener listens to, and the systems' addresses are specified.

In a typical MQSeries client-server connection, all of the clients use queue managers on the server machine. When the client puts a message on the queue, the message ultimately has to be read and processed by a program on the server. The reading program can be started when the server starts, or the queue manager can start it by using an MQSeries triggering mechanism.

An application program, whether on the client or on the server talks directly to its local queue manager. The queue manager typically resides in the same processor or domain as the program itself. The program uses the Message Queuing Interface (MQI), where the Message Queuing Interface (MQI) is a set of API calls that request services from the queue manager.

The API's provide for connection to a queue manager, disconnection from a queue manager, opening a specific queue, closing a specific queue, putting a message on a queue, getting a message from a queue, inquiring of the properties of an object, setting the properties of an object, binding, beginning a unit of work, committing a unit of work, and backing out. Also, API's can be combined, as into one API to open a queue, put on a message on the opened queue, and close the queue.

While the invention has been described with respect to certain preferred embodiments and exemplifications, it is not to limit the scope of the invention thereby, but solely by the claims appended hereto.

I claim:

1. A message queuing system for communicating messages from a first application program to a second application program, the message queuing system comprising:

a client, wherein the first application program is running on the client;

a message queuing layer including a message queue manager operable to manage a first message queue associated with the first application program running on the client;

a message pooling layer between the client and the message queuing layer, the message pooling layer including:

a connection pool that contains a pool of reusable message queuing connections between the client and the message queuing layer, the pool of reusable message queuing connections being used for placing messages from the first application program in the first message queue, the message queuing connections between the client and the message queuing layer being kept open during periods of non-use for subsequent connections by the client;

a connection pool preserver running separate threads to maintain the pool of reusable message queuing connections contained in the connection pool; and a queue manager that controls the separate running threads in the connection pool; and a message queuing API (application programming interface) that transports the messages placed in the first message queue to a second message queue associated with the second application, wherein a user of the first application specifies a queue name rather than a name of the second application in order to transport any given message from the first application to the second application.

2. A program product comprising computer readable code tangibly stored on a computer readable media, the computer readable code adapted to configure and control a computer when executing to establish:

a client, wherein a first application program is running on the client;

a message queuing layer including a message queue manager operable to manage a first message queue associated with the first application running on the client;

a message pooling layer between the client and the message queuing layer, the message pooling layer including:

a connection pool that contains a pool of reusable message queuing connections between the client and the message queuing layer, the pool of reusable message queuing connections being used for placing messages from the first application in the first message queue, the message queuing connections between the client and the message queuing layer being kept open during periods of non-use for subsequent connections by the client;

a connection pool preserver running separate threads to maintain the pool of reusable message queuing connections contained in the connection pool; and a queue manager that controls the separate running threads in the connection pool; and a message queuing API (application programming interface) that transports the messages placed in the first message queue to a second message queue associated with the second application, wherein a user of the first application specifies a queue name rather than a name of the second application in order to transport any given message from the first application to the second application.

3. The program product of claim 2, wherein the program product is encrypted and requires decryption to configure and control a computer.

4. The program product of claim 2, wherein the program product is compressed and requires decompression to configure and control a computer.

5. The program product of claim 2, wherein the program product is on computer readable distribution media and requires installation to configure and control a computer.

* * * * *